US009459760B2

(12) United States Patent
Weng et al.

(10) Patent No.: US 9,459,760 B2
(45) Date of Patent: Oct. 4, 2016

(54) METHOD AND DEVICE FOR MANAGING A USER INTERFACE

(71) Applicant: Xiaomi Inc., Beijing (CN)

(72) Inventors: Haibin Weng, Beijing (CN); Bin Wang, Beijing (CN); Daokuan Liu, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 451 days.

(21) Appl. No.: 14/076,273

(22) Filed: Nov. 11, 2013

(65) Prior Publication Data

US 2014/0143696 A1    May 22, 2014

Related U.S. Application Data

(63) Continuation-in-part of application No. PCT/CN2013/078896, filed on Jul. 5, 2013.

(30) Foreign Application Priority Data

Nov. 16, 2012   (CN) .......................... 2012 1 0465079

(51) Int. Cl.
    G06F 3/00       (2006.01)
    G06F 3/048      (2013.01)
    G06F 3/0481     (2013.01)
    G06F 3/0482     (2013.01)
    G06F 3/0488     (2013.01)

(52) U.S. Cl.
    CPC ......... *G06F 3/04817* (2013.01); *G06F 3/0482* (2013.01); *G06F 3/04883* (2013.01)

(58) Field of Classification Search
    None
    See application file for complete search history.

(56) References Cited

U.S. PATENT DOCUMENTS

| 7,490,295 | B2* | 2/2009 | Chaudhri | G06F 3/0481 715/764 |
| 8,266,538 | B2* | 9/2012 | Chaudhri | G06F 3/0481 715/764 |
| 8,331,992 | B2* | 12/2012 | Stallings | G06F 3/0488 455/412.2 |
| 2004/0212617 | A1 | 10/2004 | Fitzmaurice et al. | |
| 2006/0112354 | A1* | 5/2006 | Park | G06F 3/0481 715/835 |
| 2006/0125803 | A1* | 6/2006 | Westerman | G06F 3/04883 345/173 |
| 2007/0028231 | A1 | 2/2007 | Kelso et al. | |

(Continued)

FOREIGN PATENT DOCUMENTS

| CN | 101763219 A | 6/2010 |
| CN | 101930282 A | 12/2010 |

(Continued)

OTHER PUBLICATIONS

How to remove apps from the Android Homescreen, Jan. 2, 2013, 6 pages.*

(Continued)

*Primary Examiner* — Yongjia Pan
(74) *Attorney, Agent, or Firm* — Jun He Law Offices P.C.; James J. Zhu

(57) ABSTRACT

This disclosure discloses a method and device for managing a user interface. The user interface can display one of a multiple of layers, which may share one or more same icons of available application programs. Users can change the layer being displayed on the user interface through performing a simple touch gesture on the touch screen, thereby quickly finding out a set of application programs needed to use currently. Thus, users' operations are simplified.

21 Claims, 13 Drawing Sheets

(56) References Cited

U.S. PATENT DOCUMENTS

| | | | | |
|---|---|---|---|---|
| 2007/0101297 | A1* | 5/2007 | Forstall | G06F 3/04817 715/841 |
| 2011/0161870 | A1* | 6/2011 | Muller | G06F 3/0481 715/800 |
| 2011/0231790 | A1* | 9/2011 | Forstall | G06F 3/04817 715/779 |
| 2011/0314427 | A1* | 12/2011 | Sundararajan | G06F 9/4443 715/863 |
| 2012/0081359 | A1 | 4/2012 | Lee et al. | |
| 2012/0084697 | A1* | 4/2012 | Reeves | G06F 1/1616 715/772 |
| 2012/0096395 | A1* | 4/2012 | Ording | G06F 9/4443 715/790 |
| 2012/0204131 | A1* | 8/2012 | Hoang | G06F 9/445 715/835 |
| 2012/0256959 | A1 | 10/2012 | Ye et al. | |
| 2013/0080951 | A1 | 3/2013 | Chuang et al. | |
| 2013/0145366 | A1* | 6/2013 | Newell | G06F 3/0484 718/1 |

FOREIGN PATENT DOCUMENTS

| | | |
|---|---|---|
| CN | 102184255 A | 9/2011 |
| CN | 102298502 A | 12/2011 |
| CN | 102439558 A | 5/2012 |
| CN | 102566850 A | 7/2012 |
| CN | 102736906 A | 10/2012 |
| CN | 102760043 A | 10/2012 |
| CN | 103019586 A | 4/2013 |
| EP | 2437142 A2 | 4/2012 |
| EP | 2466438 A2 | 6/2012 |
| JP | 2002055753 A | 2/2002 |
| JP | 2011180964 A | 9/2011 |
| JP | 2012198626 A | 10/2012 |
| JP | 2012226516 A | 11/2012 |
| KR | 20100124427 A | 11/2010 |
| KR | 20110016107 A | 2/2011 |
| KR | 20110056843 A | 5/2011 |
| KR | 20110064341 A | 6/2011 |
| RU | 2011127116 A | 10/2011 |

OTHER PUBLICATIONS

Uninstall apps from Home screen, Jan. 21, 2011, 4 pages.*
Deleting apps from launcher pro, Sep. 7, 2010, 4 pages.*
"International Search Report for PCT/CN2013/078896".
Nokia_N97_Homescreen_Youtube_Video.
Extended European Search Report for EP application No. 13855130.4.

* cited by examiner

METHOD AND DEVICE FOR MANAGING A USER INTERFACE

CROSS-REFERENCE TO RELATED APPLICATIONS

This application is a Continuation-In-Part of International Application PCT/CN2013/078896, with an international filing date of Jul. 5, 2013, which claims priority to Chinese Patent Application No. 201210465079.6, filed on Nov. 16, 2012, both of which are hereby incorporated by reference in their entireties.

TECHNICAL FIELD

The present disclosure generally relates to a user interface of an electronic device with a touch screen, and more particularly, to a method and device for managing a user interface.

BACKGROUND

A user interface provided in an electronic device with a touch screen, functions as a medium of interaction between a user and the electronic device.

A user may interact with the electronic device by touching one or more soft keys, menus and shortcut icons of various application programs, then the electronic device detects and responds to the user's touch through a user interface. For example, when the user wishes to use a specific application program, he can touch an icon corresponding to the application program on the user interface. After detecting the touch, the electronic device will start the corresponding application program.

The usage of application programs has become increasingly prevalent with the growth of popularity in touch screen electronic devices. However, limited by the size of the touch screen, and with the expansion in number and variety of application programs, the user interface may have to divide into multiple pages for display when too many application programs are needed to be displayed. In one scenario where an icon corresponding to the application program which the user wishes to use is not displayed on the current page, the user may slide on the touch screen to search for the icon. After detecting the sliding touch, the electronic device displays the contents of the next page on the user interface according to the direction of the sliding touch, then the user can begin to look for the icon. The user will need to repeat this process until he finds the specific icon that he wishes to use.

One problem associated with managing user interfaces with a large collection of application programs is the prolongation and delay in time to search for a specific application. A user often needs to use different types of application programs in different situations. With a large number of application programs on multiple display pages, the user may have to spend a very long time to look for the icon of the specific application program that he wanted to use on the user interface.

SUMMARY

The present disclosure provides a method and device for managing a user interface, which allow users to quickly find a set of application programs through simple operations.

According to one aspect of embodiments of the present disclosure, a method for managing a user interface comprises: detecting a touch on a touch screen; determining whether or not the touch matches a predetermined touch gesture, wherein the predetermined touch gesture is configured to activate an operation to a layer being displayed on the user interface; and activating the operation to the layer being displayed on the user interface if the touch matches the predetermined touch gesture, wherein the layer being displayed on the user interface is one of a multiple of layers, which are allowed to share one or more same icons of available application programs.

According to another aspect of embodiments of the present disclosure, a device for managing a user interface comprises one or more processors; a touch screen coupled to the one or more processors; a memory coupled to the one or more processors; wherein the one or more processors are configured to: detect a touch on a touch screen; determine whether or not the touch matches a predetermined touch gesture, wherein the predetermined touch gesture is configured to activate an operation to a layer being displayed on the user interface; and activate the operation to the layer being displayed on the user interface if the touch matches the predetermined touch gesture, wherein the layer being displayed on the user interface is one of a multiple of layers, which are allowed to share one or more same icons of available application programs.

According to another aspect of embodiments of the present disclosure, a device for managing a user interface comprises: a detection module, configured to detect a touch on a touch screen; a determination module, configured to determine whether or not the touch matches a predetermined touch gesture, wherein the predetermined touch gesture is configured to activate an operation to a layer being displayed on the user interface; and an operation module, configured to activate the operation to the layer being displayed on the user interface if the touch matches the predetermined touch gesture, wherein the layer being displayed on the user interface is one of a multiple of layers, which are allowed to share one or more same icons of available application programs.

According to another aspect of embodiments of the present disclosure, A nonvolatile computer readable storage medium having one or more programs stored therein, which can, when it or they is/are applied to a device with a touch screen, let the device perform instructions in the following steps: detecting a touch on a touch screen; determining whether or not the touch matches a predetermined touch gesture, wherein the predetermined touch gesture is configured to activate an operation to a layer being displayed on the user interface; and activating the operation to the layer being displayed on the user interface if the touch matches the predetermined touch gesture, wherein the layer being displayed on the user interface is one of a multiple of layers, which are allowed to share one or more same icons of available application programs.

For example, the predetermined touch gesture is a predetermined layer changing gesture and the operation comprising a step of changing the layer being displayed on the user interface.

For example, the step of changing the layer being displayed on the user interface comprises: displaying a list of candidate layers on the user interface; receiving a user choice for selecting a layer from the list of candidate layers; and displaying the layer selected by the user on the user interface.

For example, the step of changing the layer being displayed on the user interface comprises: determining a subsequent layer of the layer being displayed on the user interface according to a preset order; and displaying the subsequent layer on the user interface.

For example, the multiple of layers comprise a basic layer and extended layers, and wherein the basic layer comprises icons of all the application programs, and each of the extended layers comprises icons of application programs in the same categories.

For example, the predetermined touch gesture is a predetermined layer locking gesture and the operation comprising a step of locking a layer being displayed on the user interface.

For example, the predetermined touch gesture is an application program deleting gesture and the operation comprising a step of deleting an icon of an application program corresponding to the touch in a layer being displayed on the user interface.

For example, the step of deleting the icon of the application program corresponding to the touch in the layer being displayed on the user interface comprises: determining the type of the layer being displayed on the user interface; if the layer being displayed on the user interface is the basic layer, uninstalling the application program corresponding to the touch and deleting the icon(s) of the application program corresponding to the touch from the multiple of layers; and if the layer being displayed on the user interface is the extended layer, deleting the icon of the application program corresponding to the touch from the extended layer being displayed on the user interface.

For example, if the layer being displayed on the user interface is the extended layer, the method further comprising: displaying a prompt of deletion mode, receiving a user selection, and deleting the icon of the application program corresponding to the touch from the extended layer being displayed on the user interface, or uninstalling the application program corresponding to the touch and deleting the icon(s) of the application program corresponding to the touch from each layer(s) according to the user selection.

For example, the predetermined touch gesture is a predetermined application program adding gesture and the operation comprising a step of adding an icon of an application program to a layer being displayed on the user interface.

For example, the step of adding the icon of the application program to the layer being displayed on the user interface comprises: displaying a list of candidate application programs on the user interface; receiving a user choice for selecting one or more application programs from the list of candidate application programs; and adding the icon of the application program selected by the user to the layer being displayed on the user interface.

For example, the predetermined touch gesture is a predetermined layer editing gesture and the operation comprising a step of receiving an edit instruction inputted by a user in the editing state and performing an edit operation to a layer in response to the editing instruction.

For example, the editing operation comprises at least one or more options for adding an extended layer, deleting an extended layer, merging two or more extended layers, changing the name of an extended layer, changing the background of an extended layer and changing the icon style of an application program in an extended layer.

The technical schemes provided by the embodiments of the present disclosure have the following beneficial effects:

The user interface can display a multiple of layers, each of which is associated with one or more icons of application programs. The user can change the layer being displayed on the user interface by performing a simple touch gesture on the touch screen, thereby quickly finding the set of application programs intended to be used by the user. Thus, the user operation is simplified.

BRIEF DESCRIPTION OF THE DRAWINGS

The detailed description of the embodiments of this present disclosure accompanied by brief drawings is provided for a better understanding of the technical solutions of the embodiments. The accompanying drawings below illustrate examples of the embodiments of the disclosure, in which.

Specific embodiments in this present disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

In order to make the features, the technical solutions and the advantages of the embodiments of the present disclosure more apparent, exemplary embodiments will be further described in detail below with reference to the accompanying drawings.

In the following paragraphs, methods and devices for managing a user interface according to embodiments of the present disclosure will be elaborated. In practical applications, the methods may be implemented in an electronic device such as mobile phones, computers, digital broadcast terminals, messaging devices, gaming consoles, tablets, PDAs, medical devices, exercise equipment, personal digital assistants, and the like, while the device may be integrated into the electronic device.

The electronic device includes one or more processors to receive various data, programs and instructions, and to process such data, programs and instructions accordingly. The electronic device also includes a memory which is coupled to the one or more processors and is configured to store the data, programs and instructions to be processed by the processors. Furthermore, the electronic device may further include input modules, such as a touch screen, a keyboard, a mouse or the like.

The electronic device may be provided with an operating system to implement data or instruction processing. The operating system may further comprise a user interface where interaction between a user and the electronic device occurs. The user interface allows the user to manipulate the operating system of the electronic device via user inputs, and allows the operating system to indicate the effects or reactions of the user's manipulation. Generally, the user interface may be a graphical interface where functional components such as menus, icons of application programs or navigation bars may be disposed. The user interface may generally be customized or modified by the user through operational instructions to the functional components, such as an editing operation, deleting operation, locking operation or adding operation. The user inputs can be entered into the operating system for generating the operational instructions through the input modules. The term "icon" used herein refers to a shortcut or visual representation of the application program or data document in the user interface.

Embodiment 1

Figure 1:
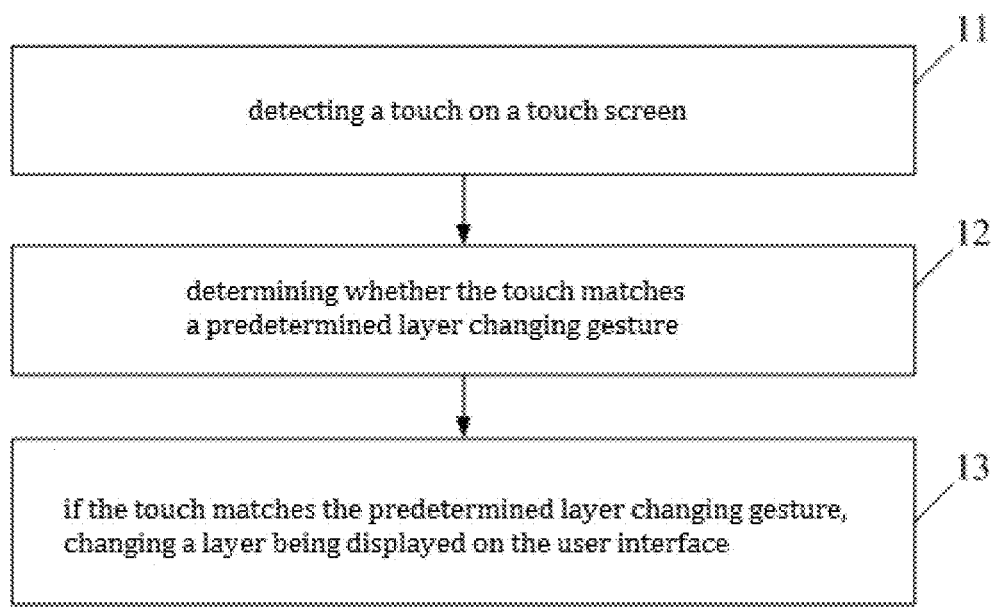
FIG. 1 is a flow chart showing a method for managing a user interface in the first embodiment of the disclosure.

FIG. 1 is the flow chart of a method for managing a user interface in the first embodiment of the present disclosure. The method includes the following steps.

In step 11, a touch on a touch screen is detected.

In step 12, whether or not a predetermined layer changing gesture matches the touch is determined.

In step 13, if the touch matches the predetermined layer changing gesture, a layer being displayed on the user interface is changed, wherein the layer being displayed on the user interface is one of a multiple of layers, which are allowed to share one or more same icons of available application programs.

Specifically, the electronic device may detect the user touch on the touch screen in a capacitive sensing or resistive sensing manner. In certain embodiments, the touch may be a single touch or multi-touch. The location of the touch on the touch screen, and possibly the sliding, tapping or any types of movements on the touch screen may be detected and tracked by the electronic device. The electronic device may identify and distinguish various gestures according to the detected location of the user touch. In other words, the electronic device may detect the touch on the touch screen and determine whether or not the touch matches a predetermined touch gesture, which is configured to activate an operation to a layer being displayed on the user interface. The electronic device activates the operation to the layer being displayed on the user interface if the touch matches the predetermined touch gesture. The predetermined touch gesture is selected from a predetermined layer changing gesture, a predetermined layer locking gesture, an application program deleting gesture, a predetermined application program adding gesture, a predetermined layer editing gesture, and the like.

Furthermore, the predetermined layer changing gestures or other gestures, which indicates a predetermined trajectory of sensing cells or points of the touch screen being touched and is associated with certain operational instructions, may be stored within the electronic device. For example, the layer changing gesture may be associated with the operation instruction for changing layers of the user interface. The term "layer" used herein refers to a graphical display area that represents a virtual file management system, which includes one or more available application programs. A display of one or more icons of its' corresponding application programs will be provided on each layer. A multiple of layers share the same database of application programs, therefore, on one hand the multiple of layers are allowed to share one or more same icons of available application programs, but on the other hand the multiple of layers are also allowed to include different application programs.

Each of the multiple of layers may be associated with one or more icons of application programs, and the relationships between the icons of application programs and the layers can be defined and modified by the user, respectively. In certain embodiments, the user may delete all of the multiple of layers, and create or add new layers into the multiple of layers. In certain embodiments, the user may delete most of the multiple of layers, and create or add new layers.

In certain embodiments, the multiple of layers includes a basic layer and one or more extended layers. The basic layer includes the icons of all the application programs, and each of the extended layers includes icons of application programs in the same categories. The categories of the application programs can be defined by its provider or by the user, alternatively, they can be identified by the operating system automatically as well. For example, the categories of the application programs used here include "no network", "working", "internet or web surfing" and so on, which are user-defined. And the names of the categories can be used as theme names of these extended layers and can be modified or user-defined as well.

In the first embodiment, the predetermined layer changing gesture indicates a trajectory of performing a two-point touch and a longitudinal sliding of the two-point touch on the touch screen. The electronic device may compare the predetermined layer changing gesture with the touch on the touch screen detected in step 11. And if the touch detected in step 11 matches this predetermined layer changing gesture, the layer being displayed on the user interface may be changed. If the touch detected in step 11 does not match the predetermined layer changing gesture, the layer being displayed on the user interface may not be changed, and the user interface may take no action, or a prompt which indicates the detected touch being invalid may be displayed on the touch screen.

The layer changing operation associated with the predetermined layer changing gesture may be performed in two optional manners.

Figure 2:
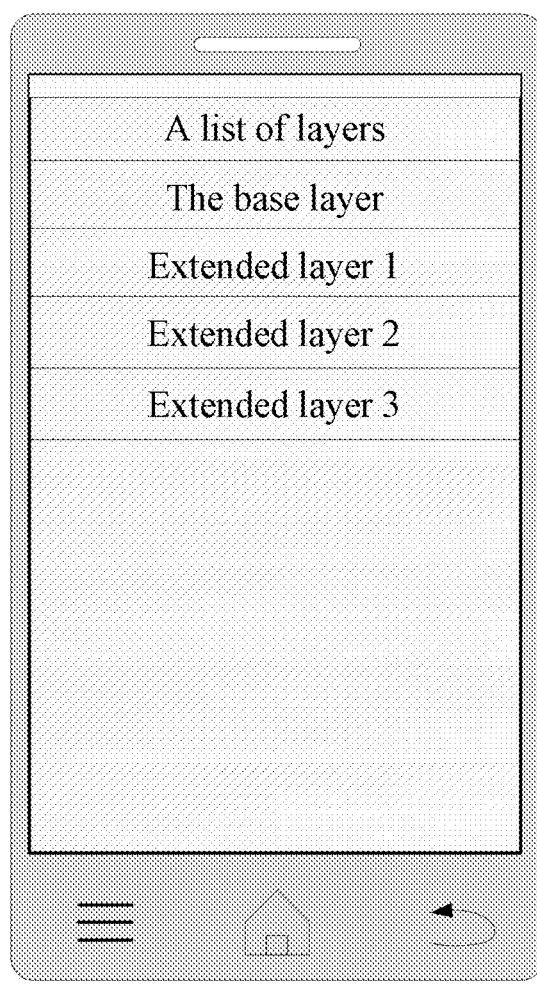
FIG. 2 is a schematic diagram illustrating a user interface displaying a layer list.

In an example, the layer changing operation may include the following sub-steps:

In step 131, a list of candidate layers is displayed on the user interface, as shown in FIG. 2.

From the list of candidate layers shown in FIG. 2, the user can perceive all the layers which can be selected including the basic layer, extended layer 1, extended layer 2 and extended layer 3. In certain embodiments, the list of candidate layers includes all of the multiple of layers. In other certain embodiments, the list of candidate layers includes all of the multiple of layer but the one being display on the touch screen. The names of the layers are merely exemplary and not limiting. In practical applications, the names of the extended layers can be directly shown in the list of candidate layers, such as "no network theme layer" and "internet or web surfing theme layer" etc., which may be modified by the user.

In step 132, a user choice for selecting a layer from the list of the candidate layers is received.

Specifically, the user can select the layer that he wants to be displayed directly through a single-point touch. After the single-point touch is detected, the user choice is received by the electronic device.

In step 133, the layer selected by the user is displayed on the user interface, which places over the layer previously displayed on the touch screen.

For example, it is assumed that what is displayed on the user interface is the basic layer. As such, if the user wants to change it to extended layer 2, then all he needs to do is to input the user choice. The electronic device can perform step 131-133 to complete the layer changing. Thus, a quick change can be achieved based on the simplified operation, and moreover, the user does not need to remember the category of the icons of application programs included in every extended layer, as he can learn about that from the theme name of the extended layer in the list of candidate layers, thereby further simplifying the user operation.

In another example, the layer changing operation may include the following sub-steps:

In step 131', according to a predetermined order, the subsequent layer of the layer being displayed on the user interface is determined.

For example, the order may be determined by making the basic layer as the first layer by default, and making the extended layers sequentially added or linked, which will be described in detail in the following embodiments. Therefore, the predetermined order here may be the order in which layers are established, and may also be other user-defined order.

In step 132', the determined subsequent layer is displayed on the user interface.

In this implementation, it is assumed that the predetermined order of arranging layers is: the base layer, extended layer 1, extended layer 2 and extended layer 3. Furthermore, what is being displayed on the user interface is extended layer 1, then extended layer 2 may be displayed on the user interface through step 131' and step 132'. If the user wants to display extended layer 3 on the user interface, then he needs to repeat steps 11~13 again.

Embodiment 2

Figure 3:
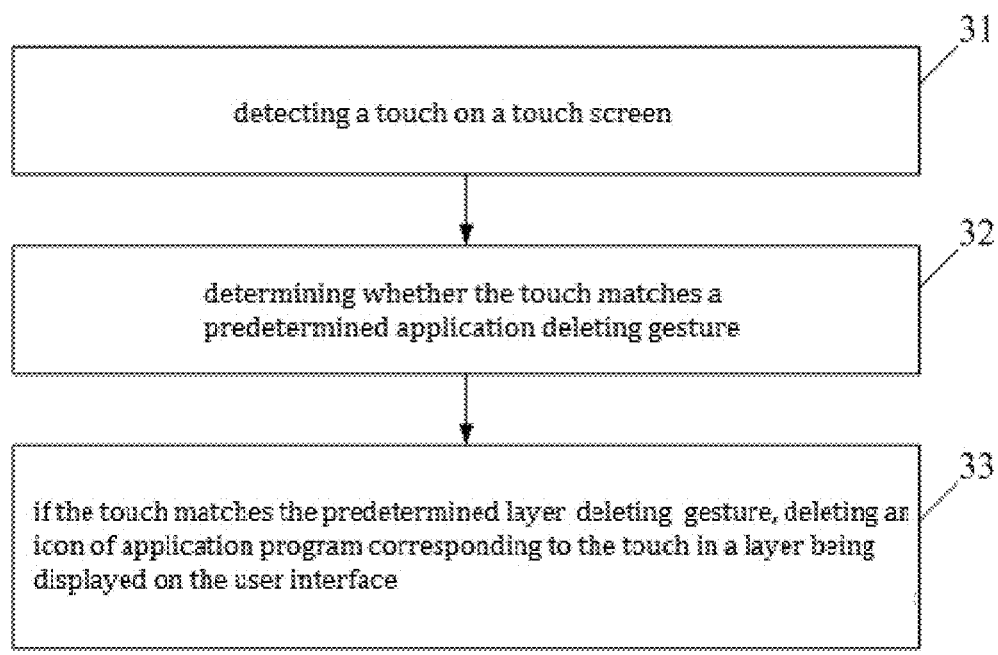
FIG. 3 is a flow chart showing a method for managing a user interface in the second embodiment of the disclosure.

FIG. 3 is a flow chart of a method for managing a user interface in the second embodiment of the disclosure. The flow process includes the following steps.

In step 31, a touch on a touch screen is detected.

In step 32, whether or not the touch matches a predetermined application program deleting gesture is determined.

In step 33, if the touch matches with the predetermined application program deleting gesture, an icon of an application program corresponding to the touch in a layer being displayed on the user interface is deleted, wherein the layer being displayed on the user interface is one of a multiple of layers, which are allowed to share one or more same icons of available application programs.

In certain embodiments, the multiple of layers includes a basic layer and one or more extended layers. The basic layer includes icons of all the application programs, and each of the extended layers includes icons of application programs in the same categories. The categories of the application programs used here include "no network", "working" and "internet or web surfing" etc., which are user-defined.

In the second embodiment, the predetermined application program deleting gesture indicates a trajectory of performing a two-point touch and a horizontal sliding on the touch screen in a rightward direction, and at least one of the two points needs to correspond with the icon of the application program to be deleted. For example, at least one of the two points needs to be positioned on the icon of the application program to be detected or move with such icon. When the detected touch in step 31 matches the predetermined application program deleting gesture, the icon of the application program corresponding to the touch in the layer being displayed on the user interface is deleted.

Specifically, when the detected touch matches the predetermined application program deleting gesture, the type of the layer being displayed on the user interface is determined. If the layer being displayed on the user interface is the basic layer, the application program corresponding to the touch may be uninstalled and the icon of the application program corresponding to the touch is deleted from each layer of the multiple of layer. If the layer being displayed on the user interface is the extended layer, the icon of the application program corresponding to the touch is deleted from the extended layer being displayed.

It can be seen from this embodiment, different ways for deleting application programs are provided for the basic layer and the extended layer, respectively. If the layer being displayed on the user interface is the basic layer, then deleting of the application program is a "hard deletion". That is, the application program is uninstalled from the electronic device, and the icon of the uninstalled application program is deleted from each layer. If the layer being displayed on the user interface is one of the extended layers, then deleting of the application program is a "soft deletion". That is, the icon of the application program is deleted from the extended layer being displayed, but the application program still exists in the electronic device and its icon may also be included in other layers.

Figure 4:
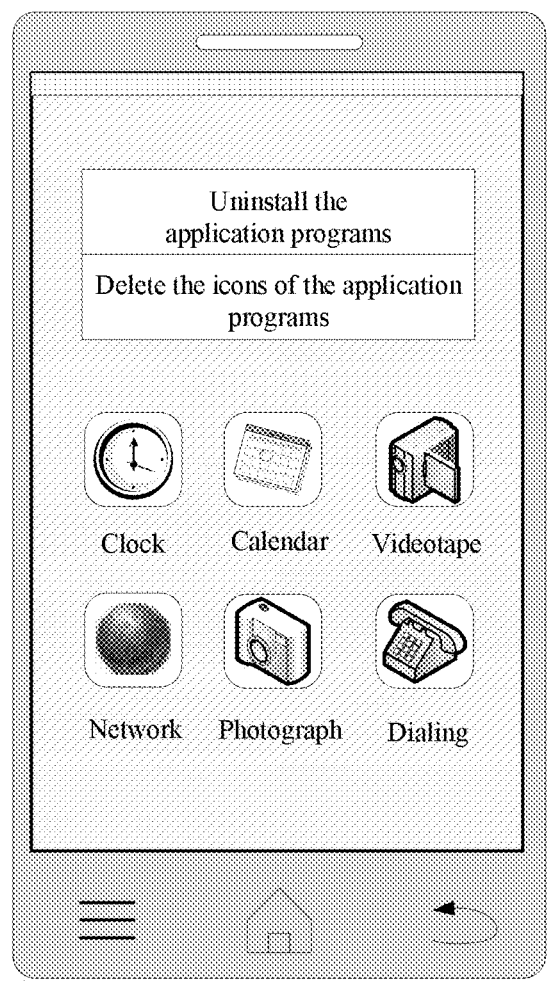
FIG. 4 is a diagram illustrating a user interface displaying a prompt of deletion mode.

In certain embodiments, if the layer being displayed on the user interface is the extended layer, a prompt of deletion mode may be displayed on the user interface first, which, suggests the user that he can either uninstall the application program entirely or only delete the icon of the application program in the extended layer being displayed, as shown in FIG. 4. Then a user selection may be received. According to the user selection, the icon of the application programs may be deleted from the extended layer being displayed, or the application program may be uninstalled and the icon of the application program corresponding to the touch is deleted from each layer. In this embodiment, the function of the "hard deletion" is also provided for the extended layers. Thus, the user may select his preferred deletion mode, which is more flexible.

Embodiment 3

Figure 5:
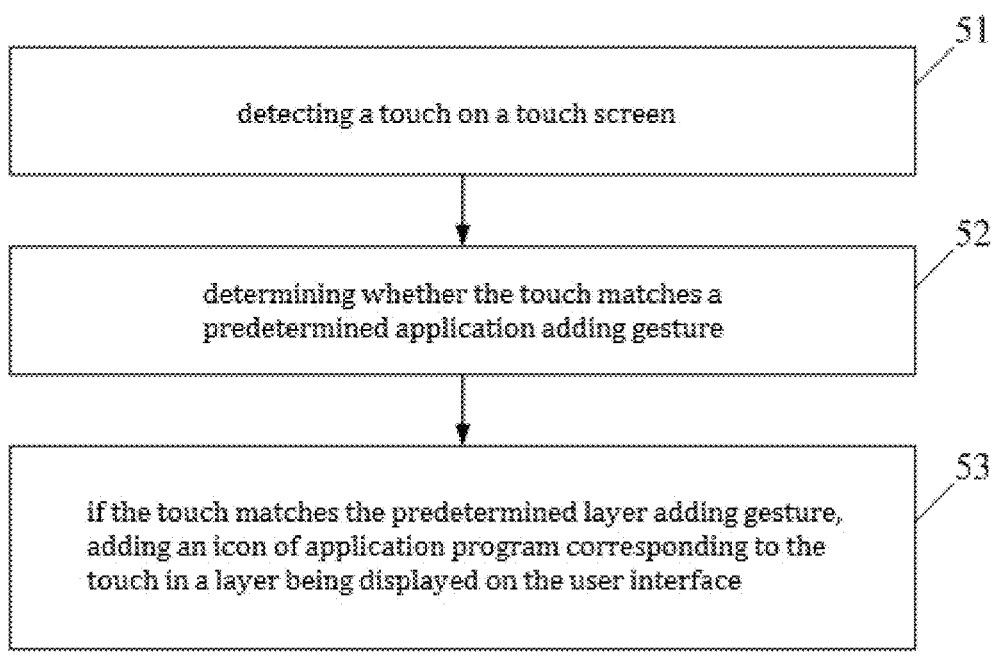
FIG. 5 is a flow chart showing a method for managing a user interface in the third embodiment of the disclosure.

FIG. 5 is a flow chart of a method for managing a user interface in the third embodiment of the disclosure. The flow process includes the following steps:

In step 51, a touch on a touch screen is detected.

In step 52, whether or not the touch matches a predetermined application adding gesture is determined.

In step 53, if the touch matches the predetermined application program adding gesture, an icon of an application program is added to a layer being displayed on the user interface, wherein the layer being displayed on the user interface is one of a multiple of layers, which are allowed to share one or more same icons of available application programs.

In certain embodiments, the multiple of layers includes a basic layer and one or more extended layers. The basic layer includes the icons of all the application programs, and each of the extended layers includes icons of application programs in the same categories. The categories of the application programs used here include "no network", "working" and "internet or web surfing" and etc., which can be user-defined.

In the third embodiment, the predetermined application program adding gesture indicates a trajectory of performing a two-point touch and a horizontal sliding on the touch screen in a leftward direction. When the touch detected in step 51 matches this predetermined application program adding gesture, an icon of an application program may be added to the layer being displayed on the user interface.

Specifically, when the detected touch matches with the predetermined application program adding gesture, a list of candidate application programs is displayed on the user interface first. Then the user's choice of one or more of these application programs is determined, and the icon(s) of the application program(s) selected by the user is added to the layer being displayed on the user interface.

With regard to different types of layers being displayed on the user interface, the list of candidate application programs may include the following cases:

Firstly, if the layer being displayed on the user interface is the extended layer, then all the application programs that have been installed in the electronic device are included into the list of candidate application programs.

Secondly, if the layer being displayed on the user interface is the basic layer, then downloadable and installed application programs are included in the list of candidate application programs. For example, application programs specifically used for downloading application programs can be opened, and a list of application programs is displayed on the user interface for the user to select.

The user can select an application program to be added through a single-point touch, and after this single-point touch is detected, the selection of the application program by the user can be determined.

Accordingly, if the layer being displayed on the user interface is the extended layer, then the icon of the application program selected by the user is added to this extended layer. If the layer being displayed on the user interface is the basic layer, then it is necessary to download and install the application program selected by the user, and to add the icon of the application program to the basic layer.

Embodiment 4

Figure 6:
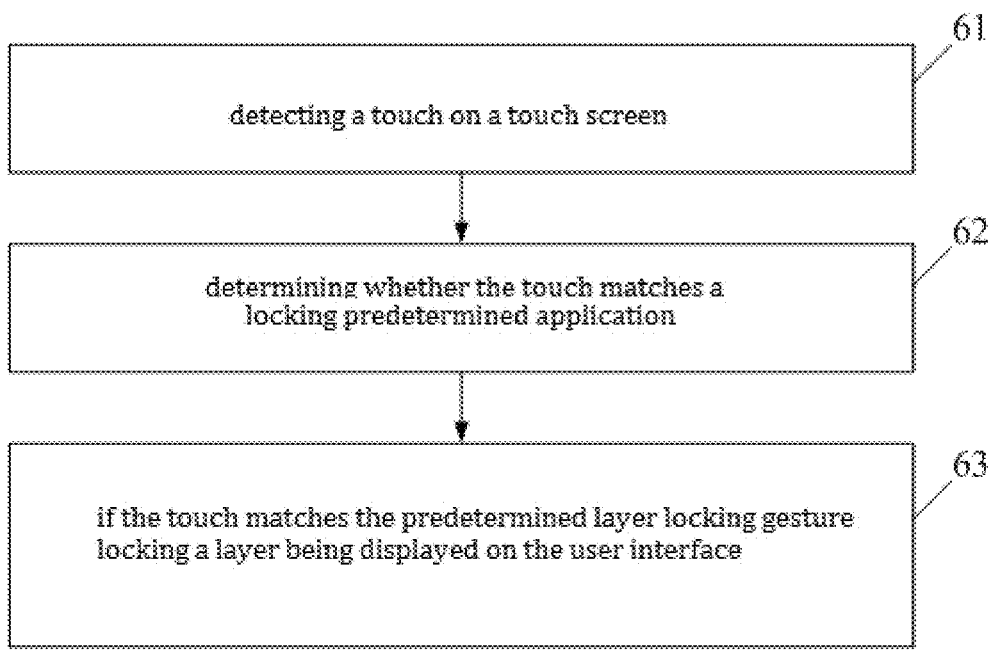
FIG. 6 is a flow chart showing a method for managing a user interface in the fourth embodiment of the disclosure.

FIG. 6 is a flow chart of a method for managing a user interface in the fourth embodiment of the disclosure. The flow process includes the following steps:

In step 61, a touch on a touch screen is detected.

In step 62, whether or not the touch matches a predetermined layer locking gesture is determined.

In step 63, if the touch matches the predetermined layer locking gesture, a layer being displayed on the user interface is locked, wherein the layer being displayed on the user interface is one of a multiple of layers, which are allowed to share one or more same icons of available application programs.

In certain embodiments, the multiple of layers include a basic layer and one or more extended layers, the basic layer includes icons of all the application programs, and each of the extended layers include icons of application programs in the same categories. For example, the categories of the application programs used here include "no network", "working" and "internet or web surfing" and etc., which are user-defined.

In the fourth embodiment, the predetermined layer locking gesture indicates a trajectory of performing a single-point touch and a sliding to form a closed pattern. When the detected touch in step 61 matches the predetermined layer locking gesture, the layer being displayed on the user interface is locked. After the locking, no response will be made to a layer changing gesture until the user performs a layer unlocking gesture, and thereby, changing of the layer being displayed due to accidental operation by the user can be prevented. Here, the layer unlocking gesture may indicate a trajectory of a single-point touch and a sliding in the reverse direction of the layer locking gesture to form a closed pattern.

Embodiment 5

Figure 7:
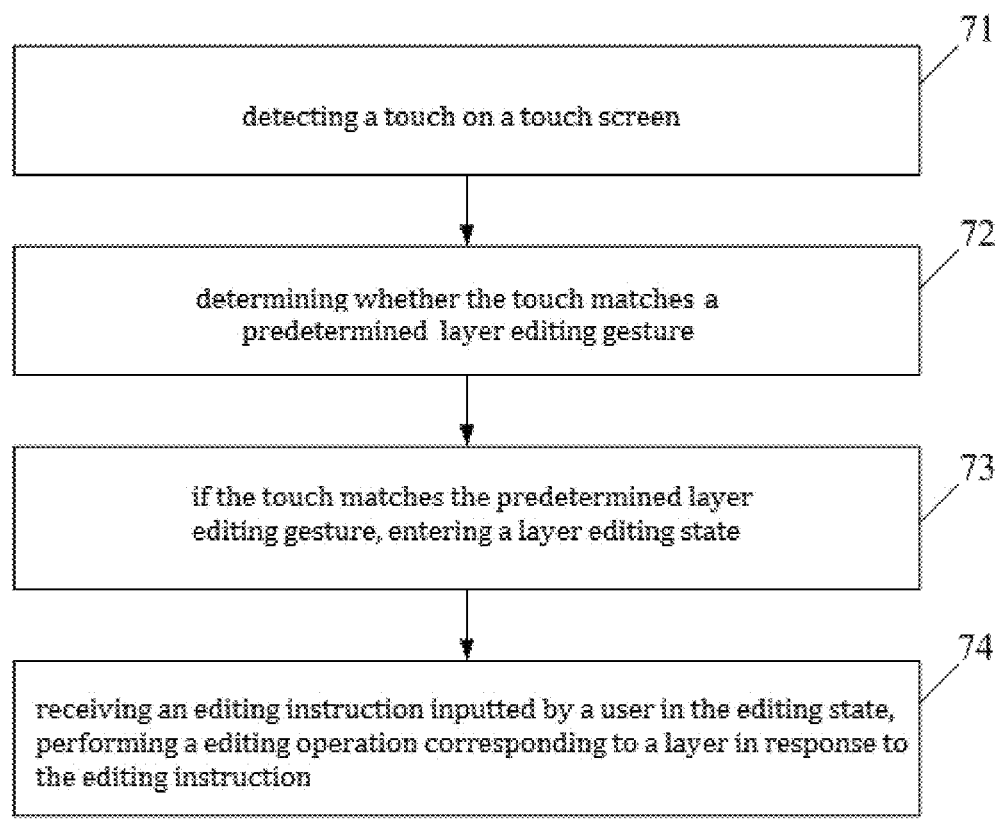
FIG. 7 is a flow chart showing a method for managing a user interface in the fifth embodiment of the disclosure.

FIG. 7 is a flow chart of a method for managing a user interface in the fifth embodiment of the disclosure. The method includes the following steps:

In step 71, a touch on a touch screen is detected.

In step 72, whether or not the touch matches a predetermined layer editing gesture is determined.

In step 73, if the touch matches the predetermined layer editing gesture, then a layer editing state is entered.

In certain embodiments, the predetermined layer editing gesture indicates a trajectory of performing a three-point touch and a longitudinal sliding of the three-point touch. If the detected touch in step 71 matches the predetermined extended layer editing gesture, the electronic device enters into the layer editing state.

In step 74, an editing instruction that is inputted by a user in the edit state is received, and a corresponding editing operation to a layer is performed in response to the editing instruction, wherein the layer being displayed on the user interface is one of a multiple of layers, which are allowed to share one or more same icons of available application programs.

In certain embodiments, the multiple of layers include a basic layer and one or more extended layers. The basic layer includes icons of all the application programs, and each of the extended layers includes icons of application programs in the same categories. For example, the categories of the application programs used here include "no network", "working" and "internet or web surfing" and etc., which are user-defined.

After entering into the layer editing state, the user can input all kinds of editing instructions, and some specific examples will be provided below.

Figure 8:
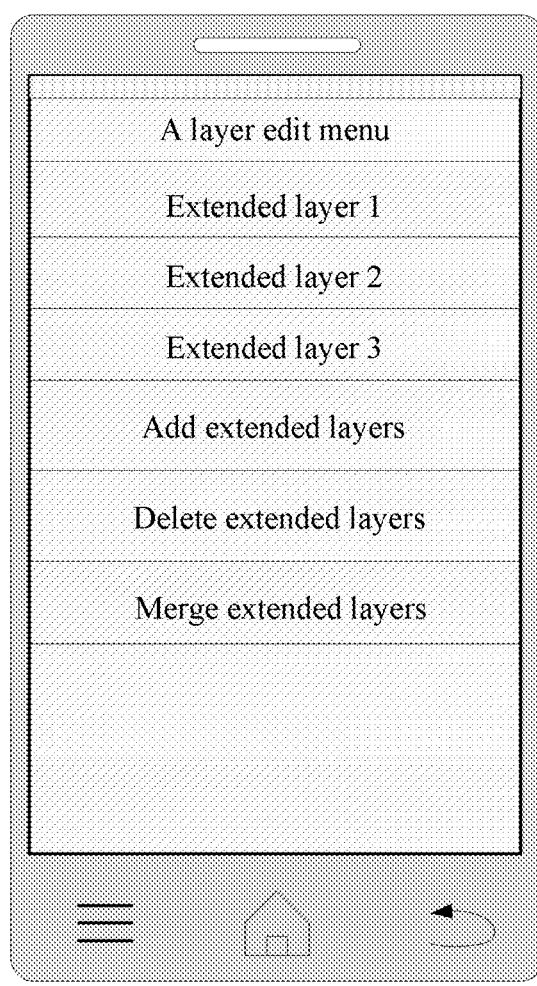
FIG. 8 is a schematic diagram illustrating a user interface displaying a layer editing menu.

A layer editing menu is displayed on the user interface, as shown in FIG. 8. This menu includes a list of currently existing extended layers and editing options such as "adding extended layers", "merging extended layers", "deleting extended layers", and etc.

Figure 9:
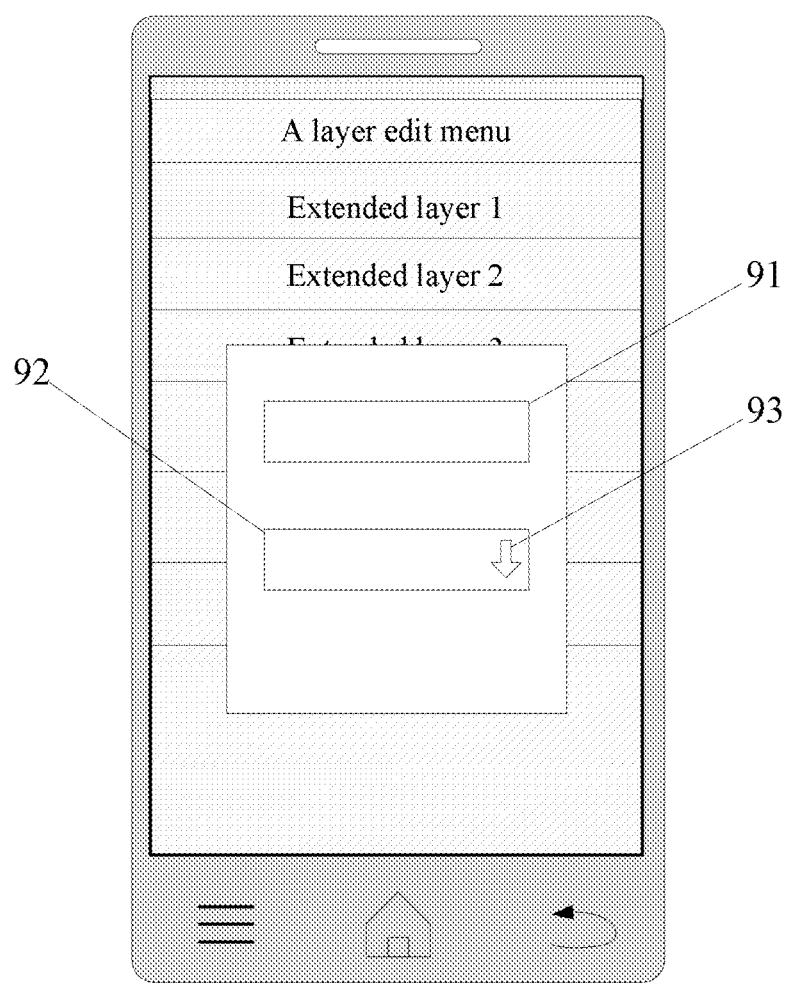
FIG. 9 is a schematic diagram illustrating a user interface displaying a dialog box for setting the extended layers.

If the user clicks the "adding extended layers" option in the extended layer editing menu, a dialog box for setting the extended layers will be displayed on the user interface, as shown in FIG. 9. The user can input the name of a newly added extended layer in an input box 91, and can further select the background, the icon display style and so on corresponding to the extended layer to be added through a pull-down menu arrow 93 in a check box 92. It can be seen that extended layers may have different backgrounds and icon display styles, which enriches the users' experience.

Figure 10:
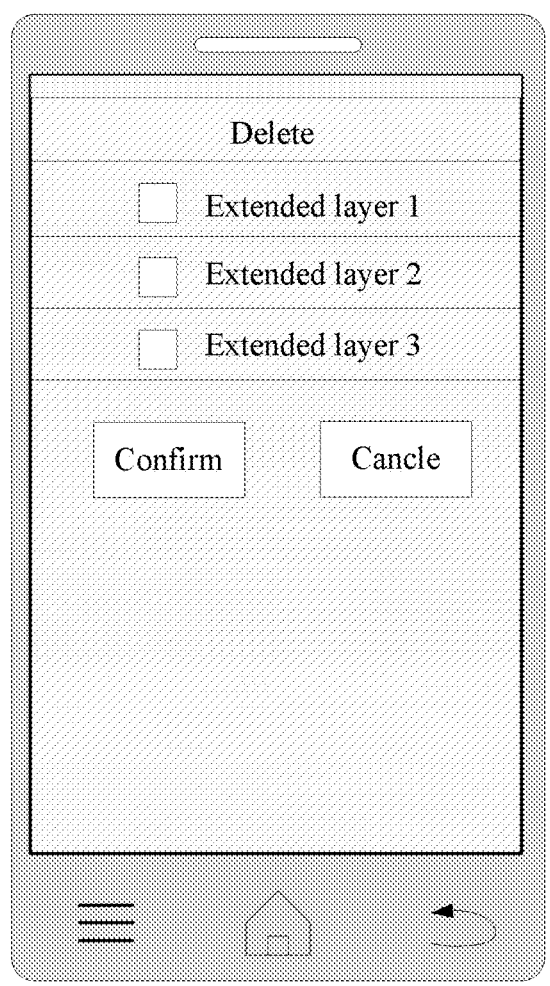
FIG. 10 is a schematic diagram illustrating a user interface displaying a state of deleting extended layers.

If the user clicks the "deleting extended layers" option in the extended layer editing menu, the device will enter into a state of deleting extended layers, as shown in FIG. 10. The user can select one or more extended layers to be deleted through checking and clicking the "confirm" option. In this embodiment, the basic layer is not allowed to be deleted by the user.

Figure 11:
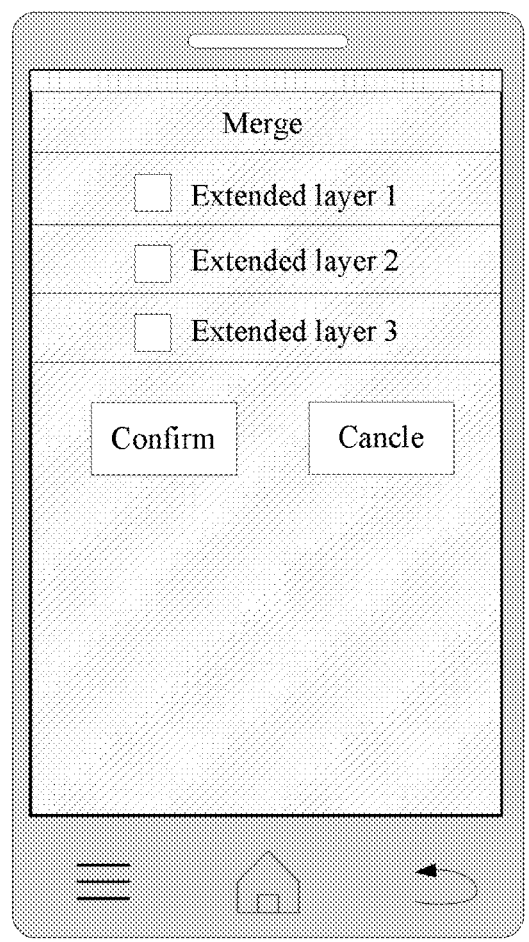
FIG. 11 is a schematic diagram illustrating a user interface displaying a state of merging extended layers.

If the user clicks the "merging extended layers" option in the extended layer edit menu, the device will enter into a state of merging extended layers, as shown in FIG. 11. The user can select two or more extended layers to be merged through checking and clicking the "confirm" option. At this time, a dialog box for setting the extended layers is displayed on the user interface, which is the same as shown in FIG. 9. The user can name the new extended layer after merging the layers in this dialog box, and can further select the background, icon display style and so on corresponding to this extended layer.

If the user clicks a certain extended layer and hold the clicking for a certain period of time, a dialog box for changing the settings of the extended layer will be displayed on the user interface, as shown in FIG. 9. The user can change the name, background, the icon display style and so on of the selected extended layer in this dialog box.

What have been given in the above schematic diagrams illustrating the user interfaces are only exemplary. It will be appreciated that the menus and dialog boxes can also have other arrangement, and the options in the menus and dialog boxes can have other arrangement as well.

An example according to the embodiments of the disclosure will be provided below.

For example, it is assumed that in addition to a basic layer, there are four extended layers included in the electronic device, which are "no network theme layer", "internet or web surfing theme layer", "working theme layer" and "old men concision theme layer", respectively.

In particular, the extended layer "no network theme layer" includes icons of local game application programs and icons of local electronic book reading application programs. The extended layer "internet or web surfing theme layer" includes icons of online game application programs, icons of webpage access application programs and icons of instant messaging application programs. The extended layer "working theme layer" includes icons of working related document application programs. And the extended layer "old men concision theme layer" includes icons of dialing application programs, icons of short message sending application programs and icons of photographing application programs.

The user can switch to the extended layer "no network theme layer" at a location where there is no network such as in an elevator, or the like, so as to use all kinds of application programs which do not require a network connection. When the electronic device is provided to the elders, the user may switch to the extended layer "old men concision theme layer" so as to facilitate and assist the elders' use of the electronic device.

When the user switches to a certain layer, he can further delete or add the icons of application programs to this layer through a touch, or lock the currently displayed layer. Furthermore, the user can perform editing operations to the layer after entering into the layer editing state.

Embodiment 6

Figure 12:
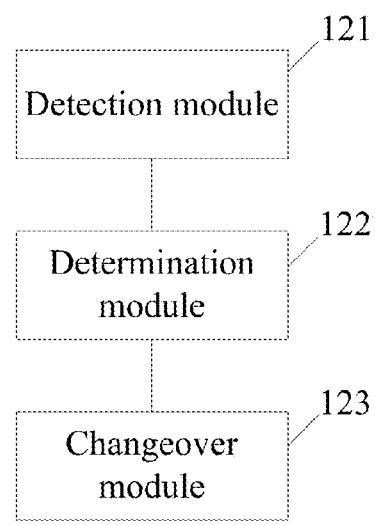
FIG. 12 is a schematic diagram illustrating a device for managing a user interface in the sixth embodiment of the disclosure.

FIG. 12 is a schematic diagram showing a device for managing a user interface in the sixth embodiment of the disclosure. The device includes: a detection module 121, a determination module 122 and a changeover module 123.

The detection module 121 is configured to detect a touch on a touch screen.

The determination module 122 is configured to determine whether or not the touch matches a predetermined layer changing gesture.

The changing module 123 is configured to change a layer being displayed on the user interface when the touch matches the predetermined layer changing gesture.

The layer is one of a multiple of layers, which are allowed to share one or more same icons of available application programs.

In certain embodiments, the multiple of layers include a basic layer and one or more extended layers, the basic layer includes icons of all the application programs, and each of the extended layers include icons of application programs in the same categories. Here, the categories of the icons include "no network", "working", "internet or web surfing" and etc., which are user-defined.

In certain embodiments, the changing module 123 includes: a first processing sub-module and a first change execution sub-module.

The first processing sub-module is configured to display a list of candidate layers on the user interface and to receive the selected layer from the list of candidate layers, when the touch matches the predetermined layer changing gesture.

The first change execution sub-module is configured to display the layer selected by the user on the user interface.

In certain embodiments, the changing module 123 includes: a second processing sub-module and a second change execution module.

The second processing sub-module is configured to determine a subsequent layer of the layer being displayed on the user interface according to a preset order when the touch matches the predetermined layer changing gesture.

The second change execution module is configured to display the subsequent layer on the user interface.

Embodiment 7

Figure 13:
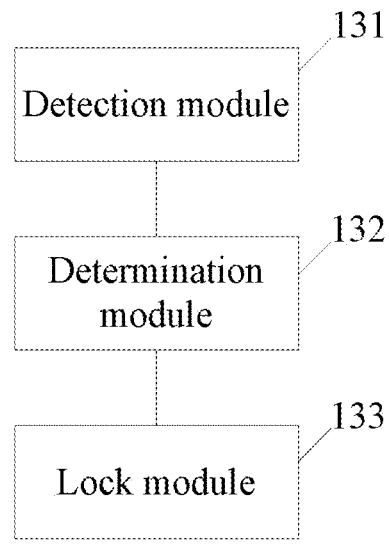
FIG. 13 is a schematic diagram illustrating a device for managing a user interface in the seventh embodiment of the disclosure.

FIG. 13 is a schematic diagram showing a device for managing a user interface in the seventh embodiment of the disclosure. The device includes: a detection module 131, a determination module 132 and a lock module 133.

The detection module 131 is configured to detect a touch on a touch screen.

The determination module 132 is configured to determine whether the touch matches a predetermined layer locking gesture.

The locking module 133 is configured to lock a layer being displayed on the user interface when the touch matches the predetermined layer locking gesture.

The layer is one of a multiple of layers, which are allowed to share one or more same icons of available application programs.

In certain embodiments, the multiple of layers include a basic layer and one or more extended layers, the basic layer includes icons of all the application programs, and each of the extended layers includes icons of application programs in the same categories. Here, the categories of the icons include "no network", "working", "internet or web surfing" and other kinds, which are user-defined.

Embodiment 8

Figure 14:
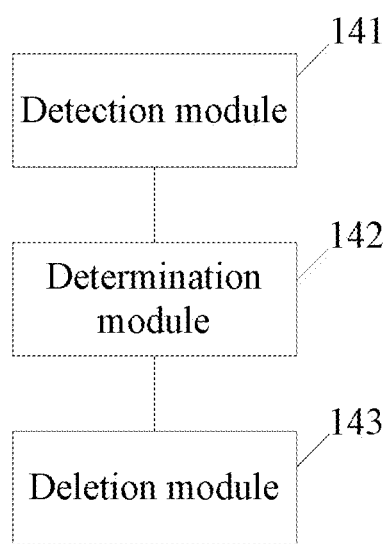
FIG. 14 is a schematic diagram illustrating a device for managing a user interface in the eighth embodiment of the disclosure.

FIG. 14 is a schematic diagram showing a device for managing a user interface in the eighth embodiment of the disclosure. The device includes: a detection module 141, a determination module 142 and a deletion module 143.

The detection module 141 is configured to detect a touch on a touch screen.

The determination module 142 is configured to determine whether the touch matches a predetermined application program deleting gesture.

The deletion module 143 is configured to delete an icon of an application program corresponding to the touch in a layer being displayed on the user interface when the touch matches the predetermined application program deleting gesture.

The layer is one of a multiple of layers, which are allowed to share one or more same icons of available application programs.

In certain embodiments, the multiple layers include a basic layer and one or more extended layers, the basic layer includes icons of all the application programs, and each of the extended layers include icons of application programs in the same categories. Here, the categories of the application programs include "no network", "working", "internet or web surfing" and etc., which are user-defined.

In certain embodiments, the deletion module 143 includes: a determination sub-module and a deletion execution sub-module.

The determination sub-module is configured to determine the type of the layer being displayed on the user interface.

The deletion execution sub-module is configured to uninstall an application program corresponding to the touch and subsequently delete the icon of the application program from each layer when the layer being displayed on the user interface is the basic layer. It is also used to delete the icon of the application program corresponding to the touch from the layer being displayed, when the layer being displayed on the user interface is the extended layer.

Further, when the layer being displayed on the user interface is the extended layer, the deletion execution sub-module is configured to display a prompt of deletion mode on the user interface, receive a user selection, and then according to the user selection, delete the icon of an application program corresponding to the touch from the extended layer being displayed, or uninstall and delete an application program from each layers that contains the application program if the user's corresponding touch is made in the basic layer.

Embodiment 9

Figure 15:
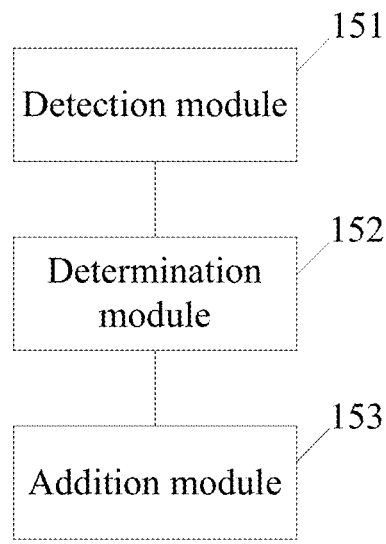
FIG. 15 is a schematic diagram illustrating a device for managing a user interface in the ninth embodiment of the disclosure.

FIG. 15 is a schematic diagram showing a device for managing a user interface in the ninth embodiment of the disclosure. The device includes: a detection module 151, a determination module 152 and an addition module 153.

The detection module 151 is configured to detect a touch on a touch screen.

The determination module 152 is configured to determine whether the touch matches a predetermined application program adding gesture.

The addition module 153 is configured to add the icon of an application program to the layer being displayed on the user interface when the touch matches the predetermined application program adding gesture.

The layer is one of a multiple of layers, which are allowed to share one or more same icons of available application programs.

In certain embodiments, the multiple of layers include a basic layer and one or more extended layers, the basic layer includes icons of all the application programs, and each of the extended layers include icons of application programs in the same categories. Here, the categories of the application programs include "no network", "working", "internet or web surfing" and etc., which are user-defined.

In certain embodiments, the addition module 153 includes: a display sub-module and an addition execution sub-module.

The display sub-module is configured to display a list of candidate application programs on the user interface.

The addition execution sub-module is configured to receive a user's choice for selecting one or more application programs and add the icon(s) of the application program(s) selected by the user to the layer being displayed on the user interface.

Embodiment 10

Figure 16:
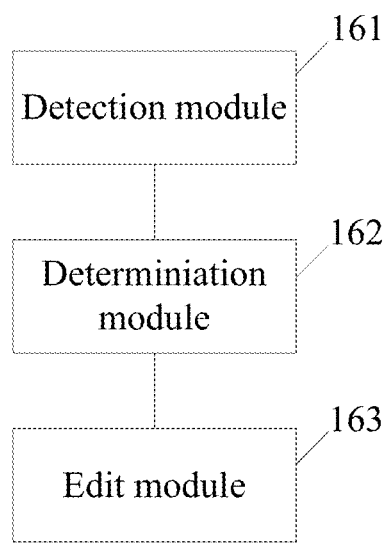
FIG. 16 is a schematic diagram illustrating a device for managing a user interface in the tenth embodiment of the disclosure.

FIG. 16 is a schematic diagram showing a device for managing a user interface in the tenth embodiment of the disclosure. The device includes: a detection module 161, a determination module 162 and an edit module 163.

The detection module 161 is configured to detect a touch on a touch screen.

The determination module 162 is used determine whether the touch match a predetermined layer editing gesture.

The editing module 163 is configured to control the user interface to enter into a layer editing state, receive an editing instruction inputted by a user in the editing state and perform an editing operation to a layer in response to the editing instruction, when the touch matches the predetermined layer editing gesture.

The layer is one of a multiple of layers, which are allowed to share one or more same icons of available application programs.

In certain embodiments, the multiple of layers include a basic layer and one or more extended layers. The basic layer includes icons of all the application programs, and each of the extended layers include icons of application programs in the same categories. Here, the categories of the extended layers include "no network", "working", "internet or web surfing" and etc., which are user-defined.

In certain embodiments, the editing operation includes at least an option for adding extended layers, deleting extended layers, merging two or more extended layers, changing name of extended layers, changing background of extended layers and/or icon style of application programs.

Embodiment 11

Figure 17:
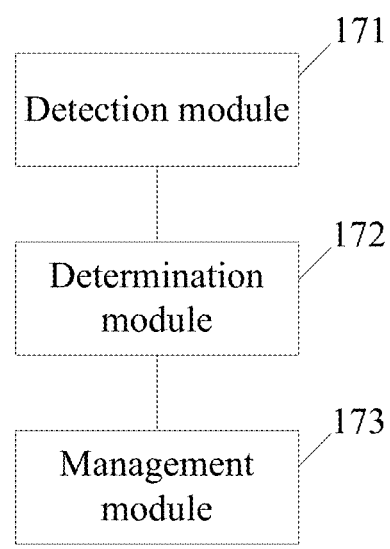
FIG. 17 is a schematic diagram illustrating a device for managing a user interface in the eleventh embodiment of the disclosure.

FIG. 17 is a schematic diagram showing a device for managing a user interface in the eleventh embodiment of the disclosure. The device includes: a detection module 171, a determination module 172 and a management module 173.

The detection module 171 is configured to detect a touch on a touch screen.

The determination module 172 is configured to determine whether or not the touch matches a predetermined layer changing gesture, a predetermined layer locking gesture, a predetermined application program deleting gesture, a predetermined application program adding gesture or a predetermined layer editing gesture.

The management module 173 is configured to change a layer being displayed on the user interface when the touch matches a predetermined layer changing gesture, to lock the layer being displayed on the user interface when the touch matches a predetermined layer locking gesture, to delete an icon of an application program corresponding to the touch in the layer being displayed on the user interface when the touch matches a predetermined application program deleting gesture, to add an icon of an application program to the layer being displayed on the user interface when the touch matches with a predetermined application program adding gesture, and to enter into a layer editing state, receive an editing instruction inputted by a user in the editing state and performing an editing operation to the layers when the touch matches a predetermined layer editing gesture.

The layer is one of a multiple of layers, which are allowed to share one or more same icons of available application programs.

In certain embodiments, the layers include a basic layer and one or more extended layers. The basic layer includes icons of all the application programs, and each of the extended layers include icons of application programs that are in the same categories. Here, the categories of the extended layers include "no network", "working", "internet or web surfing" and others that are user-defined.

With respect to the user interface managing devices in the above embodiments, the specific manners for performing operations for individual modules therein have been described in detail in the embodiments regarding the methods for managing the user interface, which will not be elaborated herein.

According to an embodiment of the disclosure, a device is further provided, which includes: one or more processors; a memory; and one or more programs stored in the memory. The one or more programs being stored in the memory and configured to be performed by the one or more processors have the follow functions: detecting a touch on a touch screen; determining whether or not the touch matches a predetermined touch gesture, wherein the predetermined touch gesture is configured to activate an operation to a layer being displayed on the user interface; and activating the operation to the layer being displayed on the user interface if the touch matches the predetermined touch gesture, wherein the layer is one of a multiple of layers, which are allowed to share one or more same icons of available application programs.

According to an embodiment of the disclosure, a device is further provided, which includes: one or more processors; a memory; and one or more programs stored in the memory. The one or more programs being stored in the memory and configured to be performed by the one or more processors have the follow functions: detecting a touch on a touch screen; determining whether or not the touch matches a predetermined layer changing gesture; if the touch matches with the predetermined layer changing gesture, changing a layer being displayed on the user interface, wherein the layer is one of a multiple of layers, which are allowed to share one or more same icons of available application programs.

According to an embodiment of the disclosure, a second device is further provided, which includes: one or more processors; a memory; and one or more programs stored in the memory. The one or more programs being stored in the memory and configured to be performed by the one or more processors have the follow functions: detecting a touch on a touch screen; determining whether or not the touch matches a predetermined layer locking gesture; and if the touch matches with the predetermined layer locking gesture, locking a layer being displayed on the user interface, wherein the layer is one of a multiple of layers, which are allowed to share one or more same icons of available application programs.

According to an embodiment of the disclosure, a third device is further provided, which includes: one or more processors; a memory; and one or more programs stored in the memory. The one or more programs being stored in the memory and configured to be performed by the one or more processors have the follow functions: detecting a touch on a touch screen; determining whether or not the touch matches a predetermined application program deleting gesture; if the touch matches with the predetermined application program deleting gesture, deleting an icon of an application program corresponding to the touch in a layer being displayed on the user interface, wherein the layer is one of a multiple of layers, which are allowed to share one or more same icons of available application programs.

According to an embodiment of the disclosure, a fourth device is further provided, which includes: one or more processors; a memory; and one or more programs stored in the memory. The one or more programs being stored in the memory and configured to be performed by the one or more processors have the follow functions: detecting a touch on a touch screen; determining whether or not the touch matches a predetermined application program adding gesture; and if the touch matches the predetermined application program adding gesture, adding an icon of an application program to a layer being displayed on the user interface, and wherein the layer is one of a multiple of layers, which are allowed to share one or more same icons of available application programs.

According to an embodiment of the disclosure, a fifth device is further provided, which includes: one or more processors; a memory; and one or more programs stored in the memory. The one or more programs being stored in the memory and configured to be performed by the one or more processors have the follow functions: detecting a touch on a touch screen; determining whether or not the touch matches a predetermined layer editing gesture; if the touch matches the predetermined layer editing gesture, entering into a layer editing state; receiving an edit instruction inputted by a user in the editing state and performing an edit operation to a layer in response to the editing instruction, wherein the layer is one of a multiple of layers, which are allowed to share one or more same icons of available application programs.

According to an embodiment of the disclosure, a sixth device is further provided, which includes: one or more processors; a memory; and one or more programs stored in the memory. The one or more programs stored in the memory and configured to be performed by the one or more processors have the follow functions: detecting a touch on a touch screen; determining whether or not the touch matches a predetermined layer changing gesture, a predetermined layer locking gesture, a predetermined application program deleting gesture, a predetermined application program adding gesture or a predetermined layer editing gesture; changing a layer being displayed on the user interface when the touch matches a predetermined layer changing gesture, locking the layer being displayed on the user interface when the touch matches a predetermined layer locking gesture, deleting an icon of an application program corresponding to the touch in the layer being displayed on the user interface when the touch matches a predetermined application program deleting gesture, adding an icon of an application program to the layer being displayed on the user interface when the touch matches with a predetermined application program adding gesture, and entering into a layer editing state, receive an editing instruction inputted by a user in the editing state and performing an editing operation to the layers when the touch matches a predetermined layer editing gesture, wherein the layer is one of a multiple of layers, which are allowed to share one or more same icons of available application programs.

According to the embodiment, a nonvolatile computer readable storage medium having one or more programs stored therein is further provided. When it is applied to a device with a touch screen, it will trigger the device into performing instructions in the following steps: detecting a touch on a touch screen; determining whether or not the touch matches a predetermined layer changing gesture; if the touch matches with the predetermined layer changing gesture, changing a layer being displayed on the user interface, wherein the layer is one of a multiple of layers, which are allowed to share one or more same icons of available application programs.

According to the embodiment, a second nonvolatile computer readable storage medium having one or more programs stored therein is further provided. When it is applied to a device with a touch screen, it will trigger the device into performing instructions in the following steps: detecting a touch on a touch screen; determining whether or not the touch matches a predetermined layer locking gesture; and if the touch matches with the predetermined layer locking gesture, locking a layer being displayed on the user interface, wherein the layer is one of a multiple of layers, which are allowed to share one or more same icons of available application programs.

According to the embodiment, a third nonvolatile computer readable storage medium having one or more programs stored therein is further provided. When it is applied to a device with a touch screen, it will trigger the device into performing instructions in the following steps: detecting a touch on a touch screen; determining whether or not the touch matches a predetermined application program deleting gesture; if the touch matches with the predetermined application program deleting gesture, deleting an icon of an application program corresponding to the touch in a layer being displayed on the user interface, wherein the layer is one of a multiple of layers, which are allowed to share one or more same icons of available application programs.

According to the embodiment, a fourth nonvolatile computer readable storage medium having one or more programs stored therein is further provided. When it is applied to a device with a touch screen, it will trigger the device into performing instructions in the following steps: detecting a touch on a touch screen; determining whether or not the touch matches a predetermined application program adding gesture; and if the touch matches the predetermined application program adding gesture, adding an icon of an application program to a layer being displayed on the user interface, and wherein the layer is one of a multiple of layers, which are allowed to share one or more same icons of available application programs.

According to the embodiment, a fifth nonvolatile computer readable storage medium having one or more programs stored therein is further provided. When it is applied to a device with a touch screen, it will trigger the device into performing instructions in the following steps: detecting a touch on a touch screen; determining whether or not the touch matches a predetermined layer editing gesture; if the touch matches the predetermined layer editing gesture, entering into a layer editing state; receiving an edit instruction inputted by a user in the editing state and performing an edit operation to a layer in response to the editing instruction, wherein the layer is one of a multiple of layers, which are allowed to share one or more same icons of available application programs.

According to the embodiment, a sixth nonvolatile computer readable storage medium having one or more programs stored therein is further provided. When it is applied to a device with a touch screen, it will trigger the device into performing instructions in the following steps: detecting a touch on a touch screen; determining whether or not the touch matches a predetermined layer changing gesture, a predetermined layer locking gesture, a predetermined application program deleting gesture, a predetermined application program adding gesture or a predetermined layer editing gesture; changing a layer being displayed on the user interface when the touch matches a predetermined layer changing gesture, locking the layer being displayed on the user interface when the touch matches a predetermined layer locking gesture, deleting an icon of an application program corresponding to the touch in the layer being displayed on the user interface when the touch matches a predetermined application program deleting gesture, adding an icon of an application program to the layer being displayed on the user interface when the touch matches with a predetermined application program adding gesture, and entering into a layer editing state, receive an editing instruction inputted by a user in the editing state and performing an editing operation to the layers when the touch matches a predetermined layer editing gesture, wherein the layer is one of a multiple of layers, which are allowed to share one or more same icons of available application programs.

According to the embodiment, a seventh nonvolatile computer readable storage medium having one or more programs stored therein is further provided. When it is applied to a device with a touch screen, it will trigger the device into performing instructions in the following steps: detecting a touch on a touch screen; determining whether or not the touch matches a predetermined touch gesture, wherein the predetermined touch gesture is configured to activate an operation to a layer being displayed on the user interface; and activating the operation to the layer being displayed on the user interface if the touch matches the predetermined touch gesture, wherein the layer is one of a multiple of layers, which are allowed to share one or more same icons of available application programs.

With respect to functions and steps involved in the devices and nonvolatile readable storage medium provided by the above embodiments of the disclosure, the specific implementations have been described in detail in the foregoing methods, and will not be elaborated herein.

Various embodiments described herein may be implemented in a nonvolatile computer readable storage medium storing programs by one or more chips, microprocessors or processors of the device. The computer can also include the device as defined in the present disclosure.

The nonvolatile computer readable storage medium may use, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory of the terminal.

The aforementioned methods can be implemented in a nonvolatile computer readable storage medium recording computer-readable codes. The nonvolatile computer readable storage medium includes all kinds of recording devices in which data readable by a computer system are stored. The nonvolatile computer readable storage medium includes ROM, RAM, CD-ROM, magnetic tapes, floppy discs, optical data storage devices, and the like.

The foregoing description, for purpose of explanation, has been described with reference to embodiments. The present disclosure may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A method for managing a user interface, comprising:
   detecting a touch on a touch screen;
   determining whether or not the touch matches a predetermined touch gesture, wherein the predetermined touch gesture is configured to activate an operation to a layer being displayed on the user interface;
   activating the operation to the layer being displayed on the user interface if the touch matches the predetermined touch gesture,
   wherein the layer being displayed on the user interface is one of a multiple of layers, which are allowed to share one or more same icons of available application programs,
   wherein the predetermined touch gesture is an application program deleting gesture and the operation comprises determining the type of the layer being displayed on the user interface; and
   if the layer being displayed on the user interface is an extended layer, the method further comprising: displaying a prompt of deletion mode, receiving a user selection, and deleting the icon of the application program corresponding to the touch from the extended layer being displayed on the user interface, or uninstalling the application program corresponding to the touch and deleting the icon(s) of the application program corresponding to the touch from each layer(s) according to the user selection.

2. The method of claim 1, wherein the predetermined touch gesture is a predetermined layer changing gesture and the operation comprising a step of changing the layer being displayed on the user interface.

3. The method of claim 2, wherein the step of changing the layer being displayed on the user interface comprises:
   displaying a list of candidate layers on the user interface;
   receiving a user choice for selecting a layer from the list of candidate layers; and
   displaying the layer selected by the user on the user interface.

4. The method of claim 2, wherein the step of changing the layer being displayed on the user interface comprises:
   determining a subsequent layer of the layer being displayed on the user interface according to a preset order; and
   displaying the subsequent layer on the user interface.

5. The method of claim 1, wherein the multiple of layers comprise a basic layer and extended layers, and wherein the basic layer comprises icons of all the application programs, and each of the extended layers comprises icons of application programs in the same categories.

6. The method of claim 1, wherein the predetermined touch gesture is a predetermined layer locking gesture and the operation comprising a step of locking a layer being displayed on the user interface.

7. The method of claim 1, wherein the predetermined touch gesture is a predetermined application program adding gesture and the operation comprising a step of adding an icon of an application program to a layer being displayed on the user interface.

8. The method of claim 7, wherein the step of adding the icon of the application program to the layer being displayed on the user interface comprises:
   displaying a list of candidate application programs on the user interface;
   receiving a user choice for selecting one or more application programs from the list of candidate application programs; and,
   adding the icon of the application program selected by the user to the layer being displayed on the user interface.

9. The method of claim 1, wherein the predetermined touch gesture is a predetermined layer editing gesture and the operation comprising a step of receiving an edit instruction inputted by a user in an editing state and performing an edit operation to a layer in response to the editing instruction.

10. The method of claim 9, wherein the editing operation comprises at least one or more options for adding an extended layer, deleting an extended layer, merging two or more extended layers, changing the name of an extended layer, changing the background of an extended layer and changing the icon style of an application program in an extended layer.

11. A device for managing a user interface, comprising:
    one or more processors;
    a touch screen coupled to the one or more processors;
    a memory coupled to the one or more processors;
    wherein the one or more processors are configured to:
    detect a touch on a touch screen;
    determine whether or not the touch matches a predetermined touch gesture, wherein the predetermined touch gesture is configured to activate an operation to a layer being displayed on the user interface;
    activate the operation to the layer being displayed on the user interface if the touch matches the predetermined touch gesture, wherein the layer being displayed on the user interface is one of a multiple of layers, which are allowed to share one or more same icons of available application programs, wherein the predetermined touch gesture is an application program deleting gesture and the operation comprises determining the type of the layer being displayed on the user interface; and if the layer being displayed on the user interface is an extended layer, the one or more processors are further configured to: display a prompt of deletion mode, receive a user selection, and delete the icon of the application program corresponding to the touch from the extended layer being displayed on the user interface, or uninstall the application program corresponding to the touch and deleting the icon(s) of the application program corresponding to the touch from each layer(s) according to the user selection.

12. The device of claim 11, wherein the predetermined touch gesture is a predetermined layer changing gesture and the operation comprising a step of changing the layer being displayed on the user interface.

13. The device of claim 12, wherein the step of changing the layer being displayed on the user interface comprises:
displaying a list of candidate layers on the user interface;
receiving a user choice for selecting a layer from the list of candidate layers; and
displaying the layer selected by the user on the user interface.

14. The device of claim 12, wherein the step of changing the layer being displayed on the user interface comprises:
determining a subsequent layer of the layer being displayed on the user interface according to a preset order; and
displaying the subsequent layer on the user interface.

15. The device of claim 11, wherein the multiple of layers comprises a basic layer and extended layers, and wherein the basic layer comprises icons of all the application programs, and each of the extended layers comprises icons of application programs in the same categories.

16. The device of claim 11, wherein the predetermined touch gesture is a predetermined layer locking gesture and the operation comprising a step of locking a layer being displayed on the user interface.

17. The device of claim 11, wherein the predetermined touch gesture is a predetermined application program adding gesture and the operation comprising a step of adding an icon of an application program to a layer being displayed on the user interface.

18. The device of claim 17, wherein the step of adding the icon of the application program to the layer being displayed on the user interface comprises:

displaying a list of candidate application programs on the user interface;
receiving a user choice for selecting one or more application programs from the list of candidate application programs; and,
adding the icon of the application program selected by the user to the layer being displayed on the user interface.

19. The device of claim 11, wherein the predetermined touch gesture is a predetermined layer editing gesture and the operation comprising a step of receiving an edit instruction inputted by a user in the editing state and performing an edit operation to a layer in response to the editing instruction.

20. The device of claim 19, wherein the editing operation comprises at least one or more options for adding an extended layer, deleting an extended layer, merging two or more extended layers, changing the name of an extended layer, changing the background of an extended layer and changing the icon style of an application program in an extended layer.

21. A nonvolatile non-transitory computer readable medium having one or more programs stored therein, which can, when it or they is/are applied to a device with a touch screen, let the device perform instructions in the following steps:
detecting a touch on a touch screen;
determining whether or not the touch matches a predetermined touch gesture, wherein the predetermined touch gesture is configured to activate an operation to a layer being displayed on the user interface;
activating the operation to the layer being displayed on the user interface if the touch matches the predetermined touch gesture,
wherein the layer being displayed on the user interface is one of a multiple of layers, which are allowed to share one or more same icons of available application programs:
wherein the predetermined touch gesture is an application program deleting gesture and the operation comprises determining the type of the layer being displayed on the user interface; and
if the layer being displayed on the user interface is an extended layer, the device further perform instructions in the following steps: displaying a prompt of deletion mode, receiving a user selection, and deleting the icon of the application program corresponding to the touch from the extended layer being displayed on the user interface, or uninstalling the application program corresponding to the touch and deleting the icon(s) of the application program corresponding to the touch from each layer(s) according to the user selection.

* * * * *